A. DIETSCHE.
CARDBOARD TIRE HOLDER.
APPLICATION FILED FEB. 14, 1917.

1,233,454.

Patented July 17, 1917.

WITNESS:
Arthur C. Johnson
Vassar H. Campbell

INVENTOR.
Adolph Dietsche
BY
Cipriano Andrade Jr.
ATTORNEY.

UNITED STATES PATENT OFFICE.

ADOLPH DIETSCHE, OF FOREST HILLS, NEW YORK, ASSIGNOR TO AMERICAN LITHOGRAPHIC COMPANY, OF NEW YORK, N. Y.

CARDBOARD TIRE-HOLDER.

1,233,454.   Specification of Letters Patent.   Patented July 17, 1917.

Application filed February 14, 1917. Serial No. 148,517.

*To all whom it may concern:*

Be it known that I, ADOLPH DIETSCHE, a citizen of the United States, residing at Forest Hills, in the county of Queens and State of New York, have invented a new and useful Cardboard Tire-Holder, of which the following is a specification.

My invention relates to improvements in card-board tire holders, and the objects of my improvements are to provide a form of tire holder which shall be very inexpensive to manufacture, which shall also be collapsible and capable of storage in a flat form, occupying very little room, and also to afford a surface on which to print display advertising matter.

Figure 1:
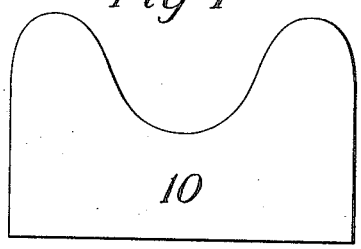
Figure 2:
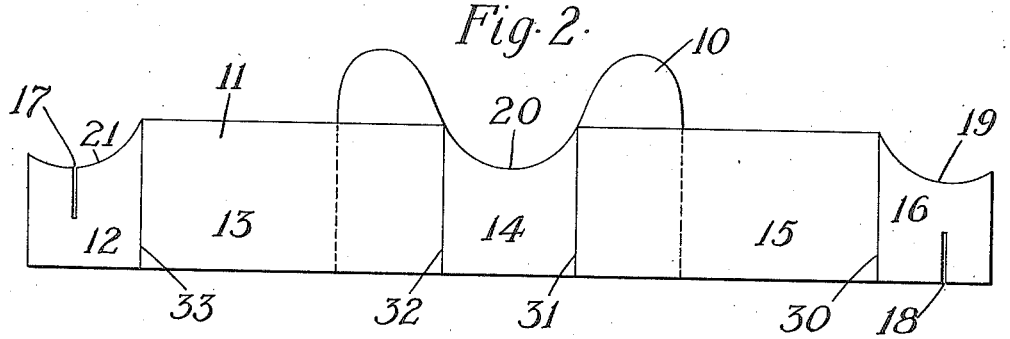
Figure 3:
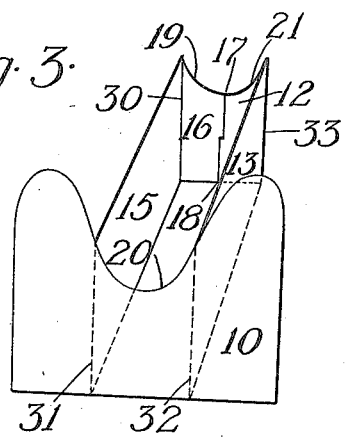

I attain these objects by the device illustrated in the accompanying drawings, in which Figure 1 is a plan view of display blank 10; Fig. 2 is a plan view of my device, complete, but extended flat; Fig. 3 is a perspective view of my device folded in position to receive an automobile tire.

Similar numerals refer to similar parts throughout the several views.

10 is a display blank of card-board, or other similar material, and 11 is a cardboard body, comprising flaps 12, 13, 14, 15 and 16, all integral with one another, and delimited by creased or perforated lines 30, 31, 32 and 33; 17 and 18 are slots cut in flaps 12 and 16, respectively; 19, 20 and 21 are rounded recesses, adapted to fit the curve on the tread of the tire. Flap 14 is fastened to display blank 10 by adhesive or other proper means, and when it is desired to prepare my device to hold an automobile tire, the various parts are folded into the form shown in Fig. 3, with notches 17 and 18 interlocking and holding members 12 and 16 together.

I claim:

In card-board tire holders in combination a display blank permanently affixed to the central fold of a second member, said second member comprising four other folds integral with said central fold, the lines between said folds being marked by a weakened line in the material comprising said second member, the end folds having notches adapted to interlock one with the other, the central and end folds also having curved recesses in their upper edge adapted to hold the tread of a rubber tire.

ADOLPH DIETSCHE.

Witnesses:
 PROSPÉRE S. VIRDEN,
 H. A. CROWLEY.